(12) United States Patent
Ring

(10) Patent No.: US 11,181,140 B1
(45) Date of Patent: Nov. 23, 2021

(54) DUAL CLEVIS PIN RETAINER SPRING ASSEMBLY AND KIT

(71) Applicant: G. Joseph Ring, Manitowoc, WI (US)

(72) Inventor: G. Joseph Ring, Manitowoc, WI (US)

( * ) Notice: Subject to any disclaimer, the term of this patent is extended or adjusted under 35 U.S.C. 154(b) by 0 days.

(21) Appl. No.: 16/944,634

(22) Filed: Jul. 31, 2020

(51) Int. Cl.
*F16D 65/38* (2006.01)
*F16C 11/04* (2006.01)
*F16D 125/28* (2012.01)

(52) U.S. Cl.
CPC ............ *F16C 11/045* (2013.01); *F16D 65/38* (2013.01); *F16D 2125/28* (2013.01)

(58) Field of Classification Search
CPC ...... F16C 11/045; F16D 65/38; F16D 65/383; F16D 65/40
See application file for complete search history.

(56) References Cited

U.S. PATENT DOCUMENTS

| 2,371,171 | A | * | 3/1945 | Holtman | B60D 1/025 403/18 |
| 3,043,583 | A | * | 7/1962 | Warne | F16F 1/123 267/74 |
| 3,680,664 | A | * | 8/1972 | Farr | F16D 65/563 188/79.64 |
| 4,249,644 | A | * | 2/1981 | Urban | F16D 65/60 188/196 D |
| 4,256,208 | A | * | 3/1981 | Najer | F16D 65/60 188/196 D |
| 5,092,568 | A | * | 3/1992 | Tachikawa | F16F 1/122 267/170 |
| 6,935,627 | B2 | * | 8/2005 | Jung | B60G 15/063 267/221 |
| 2008/0153558 | A1 | * | 6/2008 | Mifune | H04M 1/0237 455/575.4 |

* cited by examiner

*Primary Examiner* — Vishal R Sahni

(57) ABSTRACT

A dual clevis pin retainer spring assembly and kit used to attach a brake rod clevis to the brake actuator lever and the push rod for an associated automatic slack adjuster. The pin used to attach the brake actuator lever to the clevis is configured to include an engagement slot to retain an associated retainer spring pin with the pin.

20 Claims, 10 Drawing Sheets

DUAL CLEVIS PIN RETAINER SPRING ASSEMBLY AND KIT

BACKGROUND OF THE INVENTION

The present generally relates to the linkage for an automatic slack adjuster for brakes such as those used in semi-trucks and trailers. In particular, the present invention is related to the attachment of a spring to the pins which attach a brake rod clevis to the associated brake actuator lever and the push rod for the associated slack adjuster.

SUMMARY OF THE INVENTION

One embodiment of the invention provides for a dual clevis pin assembly including a first and second clevis pins, and a spring pin. The first clevis pin has a cylindrical body disposed about a first longitudinal axis, extending between first and second ends, and has a first diameter. The first clevis pin has a head on the first end and a through-hole at the second end substantially perpendicular to the first longitudinal end. The second clevis pin has a cylindrical body disposed about a second longitudinal axis, extending between third and fourth ends, and has a second diameter greater than the first diameter. The fourth end has a face substantially perpendicular to the second longitudinal axis, a head on the third end, and a through-hole at the fourth end having a longitudinal hole axis substantially perpendicular to the second longitudinal axis. The second pin also has a slot in the face which has a longitudinal slot axis substantially perpendicular to the second longitudinal axis. The hole axis and the slot axis are offset by a predefined angle greater than 45 degrees. The spring pin has a first tail which extends to a first coiled portion which extends to an engagement portion which extends to a second coil portion which terminates at a second tail. The first tail extends through the first through-hole, the second tail extends through the second through-hole, and the engagement portion engages the slot.

Another embodiment of the invention provides for an automatic slack adjuster mechanism for a vehicle braking system. The mechanism includes a slack adjuster, a clevis, a first clevis pin, a second clevis pin and a spring pin. The slack adjuster includes a braking lever including a first hole at an end thereof and an adjustment rod including a second hole at the end thereof. The clevis includes a slot having a longitudinal axis, a first set of holes each having a first diameter disposed about a first central axis perpendicular to the longitudinal axis and a second set of holes having a second diameter disposed about a second central axis perpendicular to the longitudinal axis. The first diameter is greater than the second diameter. The a first clevis pin has a cylindrical body disposed about a first longitudinal axis, extends between first and second ends, and has a first diameter. The first clevis pin has a head on the first end and a through-hole at the second end substantially perpendicular to the first longitudinal end. The first clevis pin extends through the second set of holes and the second hole to attach the adjustment rod to the clevis. The second clevis pin has a cylindrical body disposed about a second longitudinal axis, extends between third and fourth ends, and has a second diameter greater than the first diameter. The fourth end has a face substantially perpendicular to the second longitudinal axis, a head on the third end, a through-hole at the fourth end having a longitudinal hole axis substantially perpendicular to the second longitudinal axis, and a slot in the face having a longitudinal slot axis substantially perpendicular to the second longitudinal axis. The hole axis and the slot axis are offset by a predefined angle greater than 45 degrees. The second clevis pin extends through the first set of holes and the first hole to attach the break lever to the clevis. The spring pin has a first tail which extends to a first coiled portion which extends to an engagement portion which extends to a second coil portion which terminates at a second tail. The first tail extends through the first through-hole, the second tail extends through the second through-hole, and the engagement portion engages the slot.

Another embodiment of the invention provides for a dual clevis pin and spring kit. The kit includes a pair of first clevis pins, a second clevis pin, a third clevis pin, a first spring pin, a second spring pin and packaging for containing the pins. The pair of first clevis pins each have a cylindrical body disposed about a first longitudinal axis, extends between first and second ends, and has a first diameter. The first clevis pins each have a head on the first end and a first through-hole at the second end substantially perpendicular to the first longitudinal end. The second clevis pin has a cylindrical body disposed about a second longitudinal axis, extends between third and fourth ends, and has a second diameter greater than the first diameter. The fourth end has a face substantially perpendicular to the second longitudinal axis, a head on the third end, a second through-hole at the fourth end having a longitudinal first hole axis substantially perpendicular to the second longitudinal axis, and a first slot in the face having a longitudinal first slot axis substantially perpendicular to the second longitudinal axis. The first hole axis and the first slot axis are offset by a predefined angle greater than 45 degrees. The third clevis pin has a cylindrical body disposed about a third longitudinal axis, extends between fifth and sixth ends, and has the second diameter. The sixth end has a face substantially perpendicular to the third longitudinal axis, a head on the fifth end, a third through-hole at the sixth end having a longitudinal second hole axis substantially perpendicular to the third longitudinal axis, and a second slot in the face having a longitudinal second slot axis substantially perpendicular to the third longitudinal axis. The second hole axis and the second slot axis are offset by an angle opposite to that of the predetermined angle. The first spring pin has a first tail which extends to a first coiled portion which extends to first engagement portion which extends to a second coiled portion which terminates at a second tail. The first tail is extendable through one of the first through-holes, the second tail is extendable through the second through-hole, and the first engagement portion is engageable with the first slot when the second tail is within the second through-hole. The second spring pin has a third tail which extends to a third coiled portion, opposite in configuration to the first coiled portion, which extends to a second engagement portion which extends to a fourth coil portion which terminates at a fourth tail. The third tail is extendable through the other of the first through-holes, the fourth tail is extendable through the second through-hole, and the second engagement portion is engageable with the second slot when the fourth tail is within the third through-hole.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
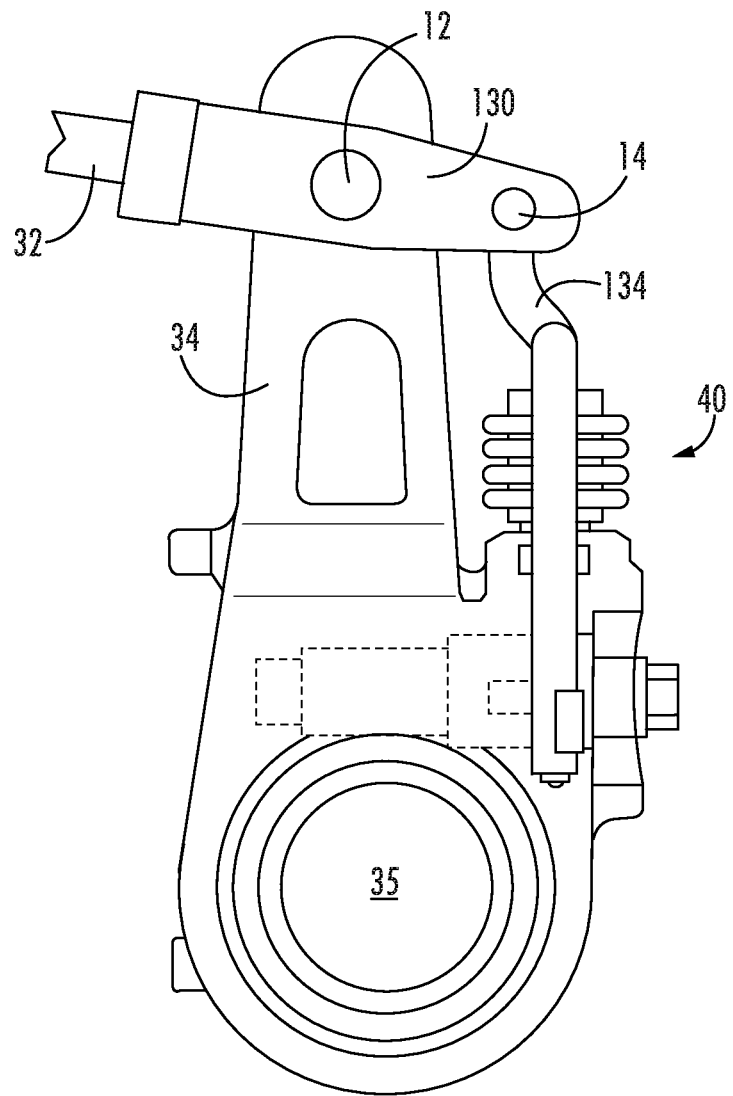
FIG. 1 is a side schematic view illustrating the relationship of a brake actuator lever, a slack adjuster push rod and the associated slack adjuster when actuated to apply the associated brakes.
Figure 2:
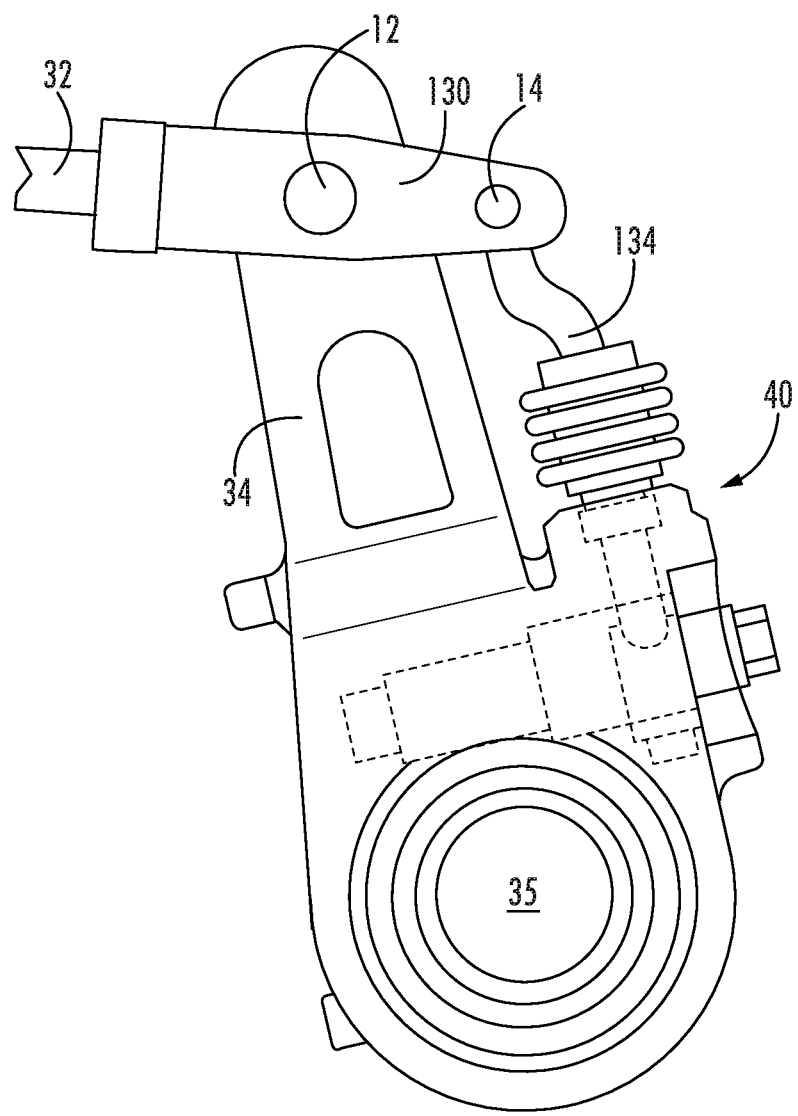
FIG. 2 is a side schematic view illustrating the relationship of a brake actuator lever, a slack adjuster push rod and the associated slack adjuster when actuated to disengage the associated brakes.

FIGS. 1 and 2 illustrate a brake actuation system 10 which includes a braking force generation unit, such as an air brake actuator of semi-tractor or trailer. An actuating rod 32 is coupled between the air brake actuator and a clevis 130. A lever clevis pin 12 connects the actuating rod 32 to a brake actuation lever 34. Pressure operating on a diaphragm within the actuator in response to a brake request, such as that initiated by depression of a brake foot pedal, moves the actuating rod 32, which in turn rotates the actuation lever 34. Lever 34 is coupled to a cam by a shaft 35 to move the brake friction linings of brake shoes into contact with a brake drum when lever 34 is moved. Over time, the thickness of the brake friction linings decreases as a result of wear, which in turn increases the amount of braking action required to brake the associated vehicle To compensate for brake lining wear, a slack adjuster rod 134 is connected to the clevis 130 by an adjuster clevis pin 14. The rod 134 interacts with the associated automatic slack adjuster 40 as shown and described in detail U.S. Pat. No. 8,820,490. As illustrated by the different braking orientations shown in FIGS. 1 and 2, the adjuster rod 134 is moved relative to the slack adjuster 40 each time the brakes are activated. When a predetermined amount of motion is required to activate the brakes due to excessive brake wear, the rod forces the slack adjuster 40 to take up slack within the braking system as described and shown in U.S. Pat. No. 8,820,490. (FIGS. 1 and 2 are taken in part from prior art U.S. Pat. No. 8,820,490. U.S. Pat. No. 8,820,490 is hereby incorporated by reference its entirety.)

A problem which is not addressed by U.S. Pat. No. 8,820,490 is rotation of the lever clevis pin 12 and adjuster clevis pin 14 relative to clevis 130. Typically, these pins include separate retainer pins (e.g. cotter pins) to hold each pin 12 and 14 in engagement with clevis 130 and the respective lever 34 and rod 134. As a result, during brake activations, pins 12 and 14 are free to rotate relative to the holes within which they reside in the clevis 130 and the respective lever 34 and rod 134.

To address this problem, spring retainer pins 16 (left configuration) and 18 (left configuration) as shown in FIGS. 3-8 (right pin only shown in FIGS. 3 and 8) have been developed. By way of example, Spectra Industries sells the spring retainer pins shown in FIGS. 3-8. These pins 16, 18 include a first tail 161 which extends to a first coiled portion 162 which extends to pin retention/engagement portion 20 which extends to a second coil portion 164 which terminates at a second tail 165. By way of example, these pins 16, 18 are fabricated from 0.0100 inch 302 stainless steel wire having a circular cross-section and a diameter of 0.0100 inches or a square cross-section having an equivalent thickness. Pins 16, 18 are designed to resiliently attach pins 12 and 14 together to limit rotation of pins 12 and 14 in their respective holes of the associated clevis 130. Pins 16 and 18 engage an appropriately sized hole in the ends of clevis pins 12, 14. Typically clevis pin 12 is 0.5 inches in diameter and pin 14 is 0.25 inches in diameter.

Installing and uninstalling a spring retainer spring such as pin 16 into associated pins 12 and 14 is relatively difficult due to the fact that it is done relative to a fully assembled braking system on a vehicle. The process of installation is hereby described in reference to FIGS. 3-6 which are taken in part from the assembly instructions for spring retainer pins 16, 18 sold by Spectra. These figures are prior art.

Figure 3:
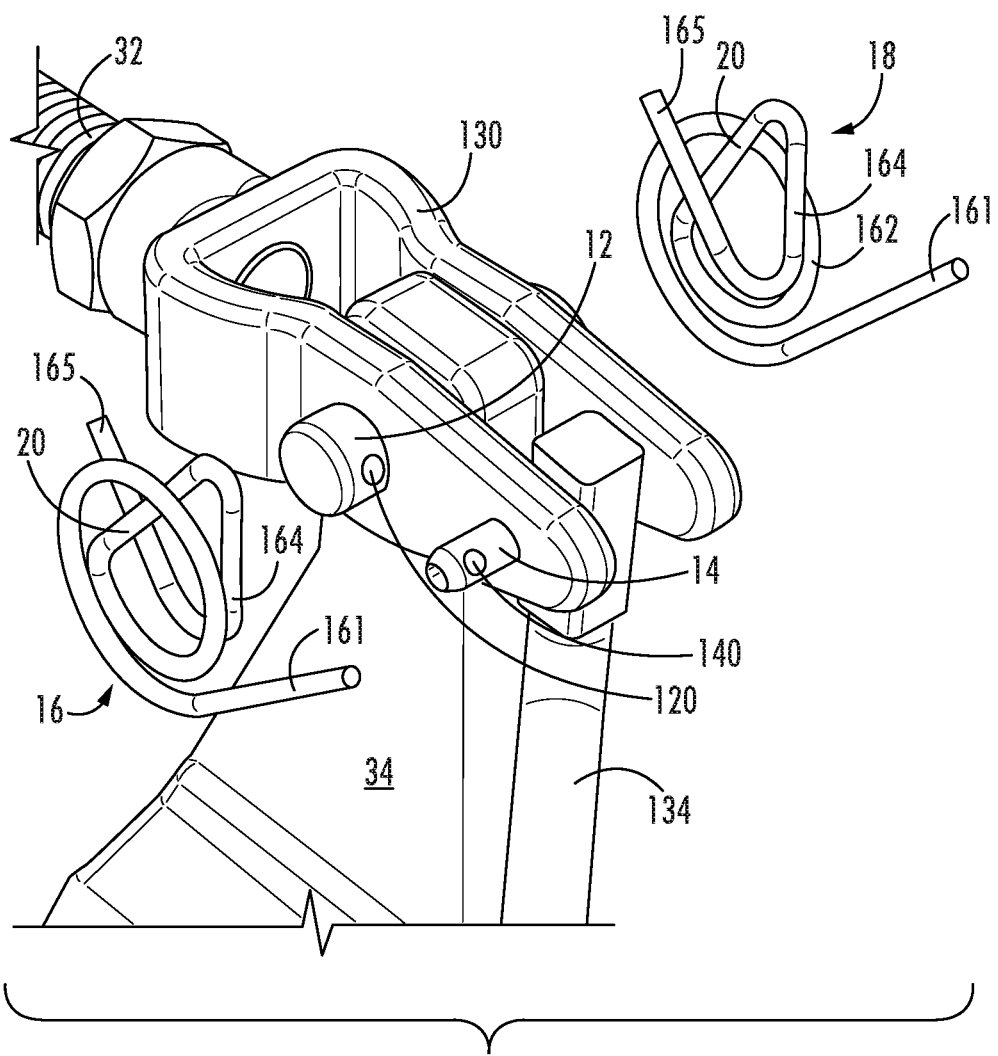
FIG. 3 is a perspective view of the brake actuator lever and the slack adjuster push rod connected to a brake actuator clevis by a lever clevis pin and an adjuster clevis pin. Also shown in FIG. 3 are left and right a pin retainer springs which are mirror images of each other.
Figure 4:
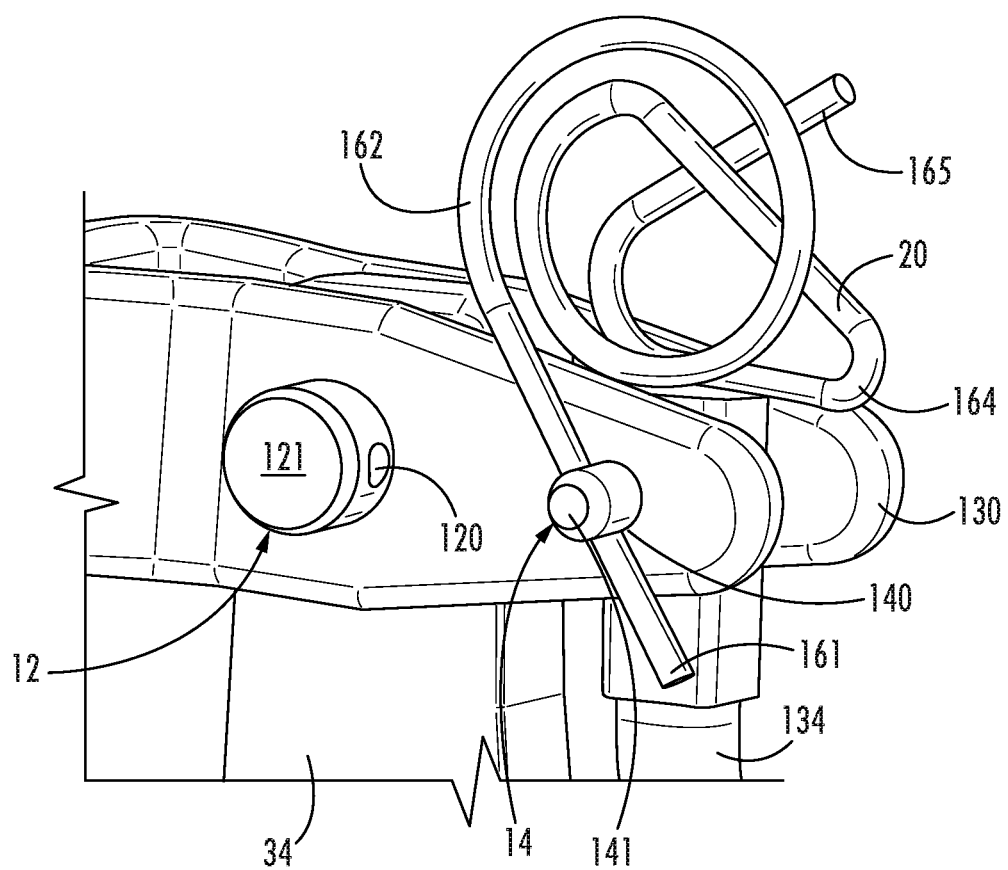
FIGS. 4-6 are perspective views of the relationship of a left pin retainer spring shown progressing from an initial engagement with the clevis pins into a full engagement with the clevis pins.

FIG. 3 illustrates the orientation of left spring pin 16 just prior to installation. FIG. 4 illustrates tail 161 of pin 16 engaged with the through-hole 140 in the end of pin 14. The longitudinal axis of hole 13 is substantially perpendicular to the longitudinal axis of pin 14.

Figure 5:
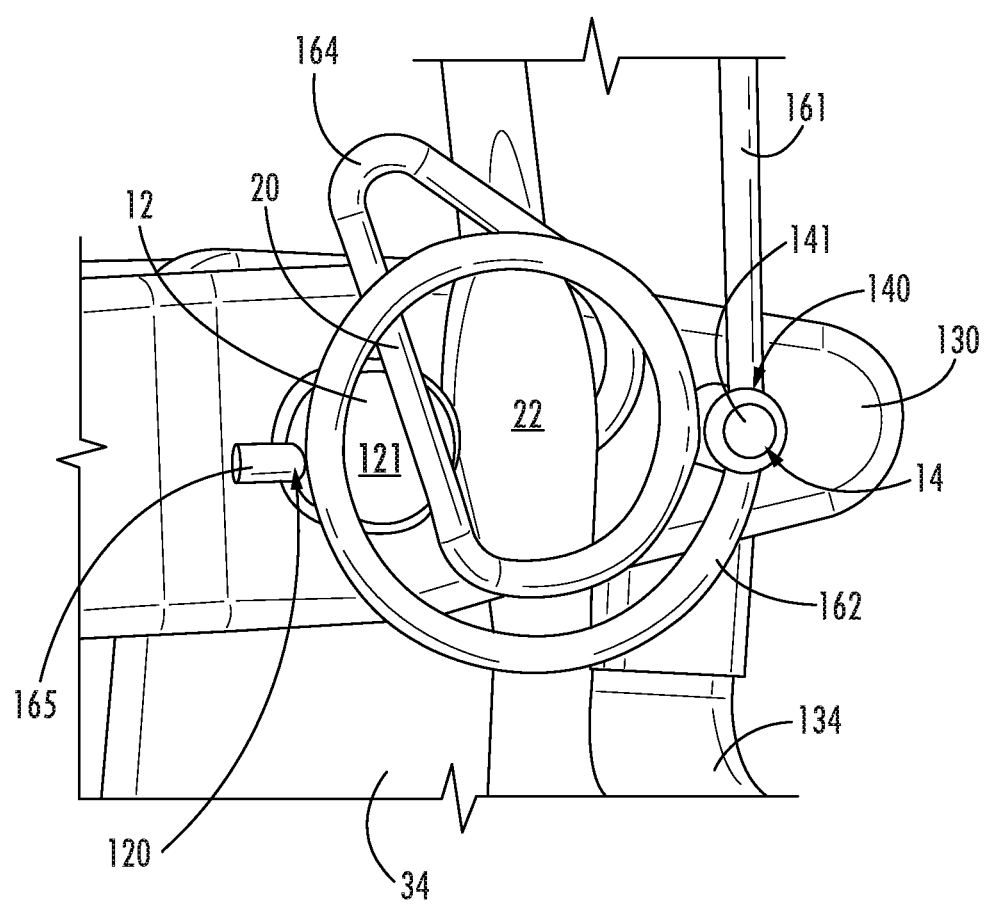

FIG. 5 illustrates pin 16 after tail 165 has been manipulated into engagement with the hole 120 in the end of pin 12 and illustrates the tip of a screwdrivers 22 used to manipulate pin 16 into the end hole 120 of pin 12. The longitudinal axis of hole 120 is substantially perpendicular to the longitudinal axis of pin 12. For springs 16, 18 having a diameter of 0.100 inches, holes 120, 140 would have a diameter of about 0.125 inches. Additionally, the ends 121 and 141 of pins 12 and 14 are a circular flat surface perpendicular to the respective longitudinal axes of the pins. Additionally, these ends may be chamfered as necessary for a particular application. The opposite ends of pins 12, 14 include heads 122 and 123 respectively.

Figure 6:
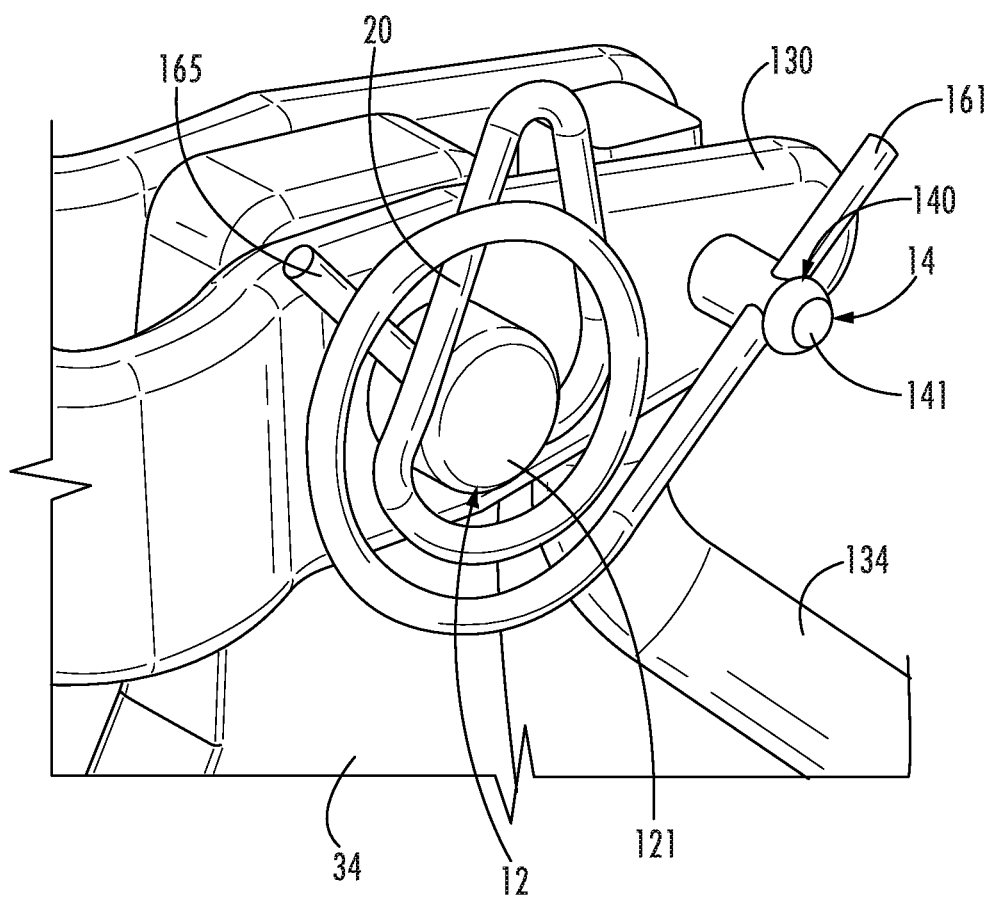

FIG. 6 illustrates the spring pin 16 fully engaged with pins 12 and 14. This full engagement requires that pin retention portion 20 be slid over the tip of pin 12 to catch the tip of pin 12 and retain/prevent pin 16 from disengaging with pins 12 and 14 upon repeated brake actuation.

The drawback with the arrangement described above, is the pins 12 and 14 are normally steel pins and the manipulation of spring pin 16 relative to pins 12 and 14 during installation and removal of pin 16 is extremely difficult even with the use of a screwdriver 22.

As described below, there is provided a novel configuration for the tip of pin 12 which provides a more reliable and defined engagement between the tip of pin 12 and the pin retention portion 20 of pin 16. Additionally, this configuration reduces the manual effort and dexterity required to install and remove pin 16 from the tips of pins 12 and 14.

Figure 7:
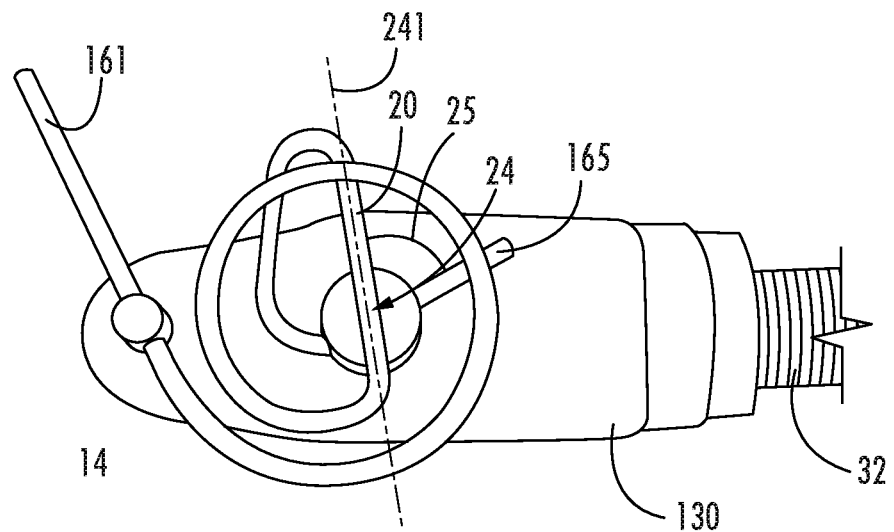
FIG. 7 is a side view illustrating a left pin retainer spring in full engagement with a slotted lever clevis pin and an adjuster clevis pin.
Figure 8:
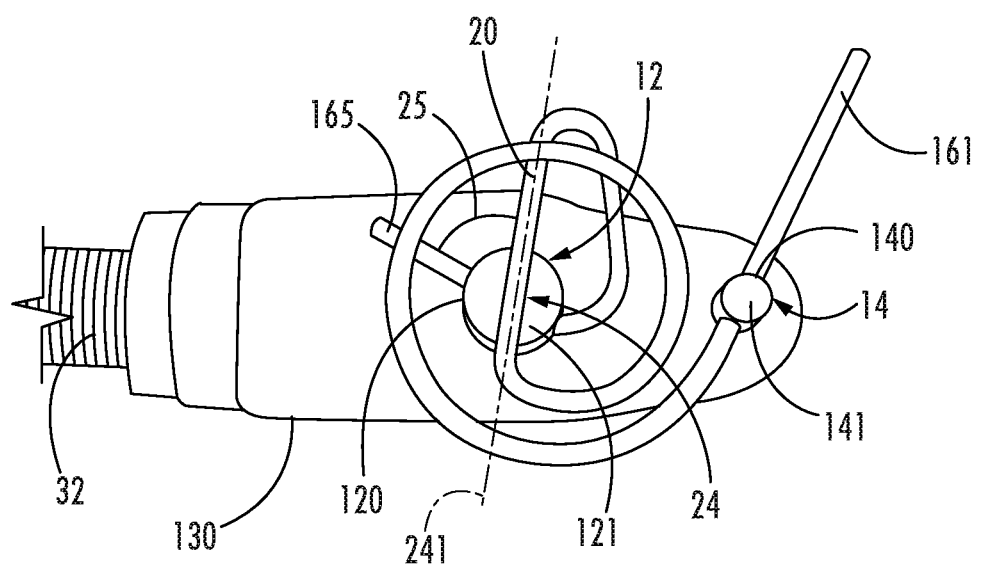
FIG. 8 is a side view illustrating a right pin retainer spring in full engagement with a slotted lever clevis pin and an adjuster clevis pin.

Referring to FIGS. 7 and 8 the pin 12 is fabricated to include a slot 24 machined into the end 121 of pin 12. Slot 24 has a longitudinal axis 241 which is substantially perpendicular to the longitudinal axis of pin 12. The slot has a depth which is in the range of 60 to 100% of the diameter of the wire from which the associated pin 16, 18 is fabricated. For wire having a diameter of 0.0100 inches, slot 24 would have a depth between 0.060 inches and 0.100 inches, but preferably 0.075 inches. The width of the slot 24 is between 0.1% and 2% greater than the diameter of the pin 16, 18 wire and the bottom of the slot 24 has a circular cross section with a diameter equal to the width of the slot 24. For wire having a diameter of 0.0100 inches, slot 24 would have a width between 0.110 inches and 0.130 inches, but preferably 0.125 inches.

FIG. 7 illustrates a left side installation for pins 12 and 14 with a left handed pin 16. To accommodate this configuration, longitudinal axis of slot 24 is machined relative to the central axis of the pin hole 120 in the end of pin 12 at an angle substantially the same as the angle between pin retention portion 20 and pin tail 161. By way of example, for the left pins 16 sold by Spectra Industries this angle 25 is about 70 degrees.

FIG. 8 illustrates a right side installation for pins 12 and 14 with a right handed pin 18. To accommodate this configuration, longitudinal axis of slot 24 is machined relative to the central axis of the pin hole 120 in the end of pin 12 at an angle substantially the same as the angle between pin portion 20 and pin tail 161 for right handed pin 18. Right handed pin 18 is the mirror image of a left handed pin 16. Accordingly, the relationship between the slot 24 and the hole in a pin 12 used with a right handed pin 16 is the mirror image of that for a pin 12 used with a left handed pin 18. As such, a right-handed lever clevis pin 12 would have an end hole and slot 24 relationship which is the mirror image of a right-handed lever clevis pin 12.

As discussed above, pins 12 and 14 are typically fabricated from steel. The problem with this material is that it must function in a wet and often saline environment and is subjected to the conditions highly conducive to rusting. Accordingly, when a vehicle having such pins in a braking system sits for a period of time, the pins 12 and 14 may rust tight to clevis 13, lever 34 and rod 134. Accordingly, the pins 12 and 14 of the present invention are preferably fabricated from a stainless steel such as series 316.

Figure 9A:
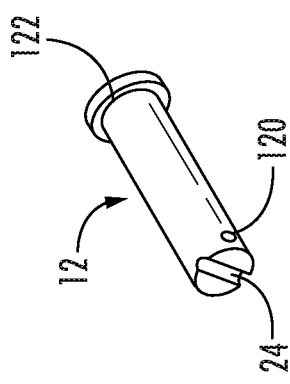
FIG. 9a is a perspective view of an embodiment of right lever clevis pin.
Figure 9D:
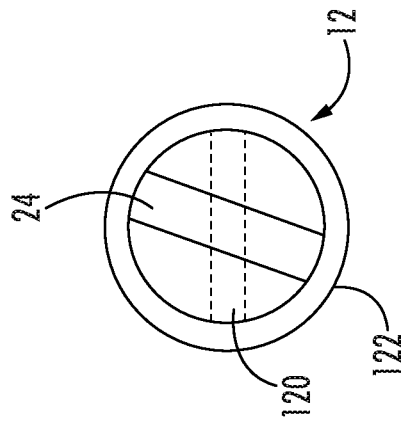
FIG. 9d is a detailed end view of an embodiment of right lever clevis pin.
Figure 9B:
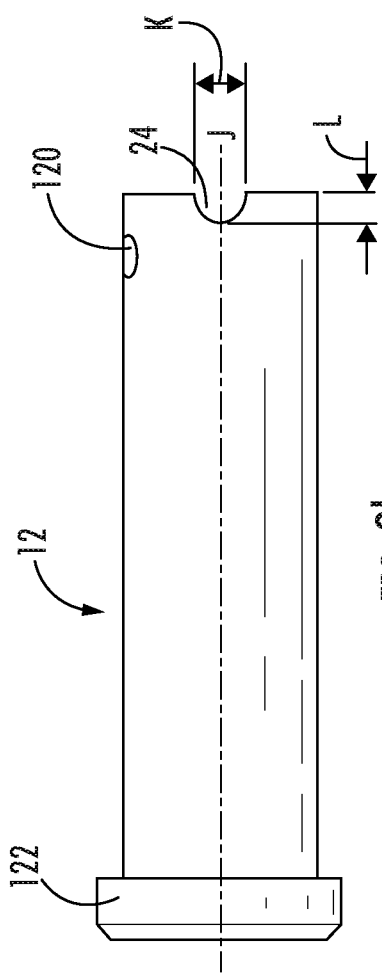
FIG. 9b is a detailed side view of an embodiment of right lever clevis pin.
Figure 9C:
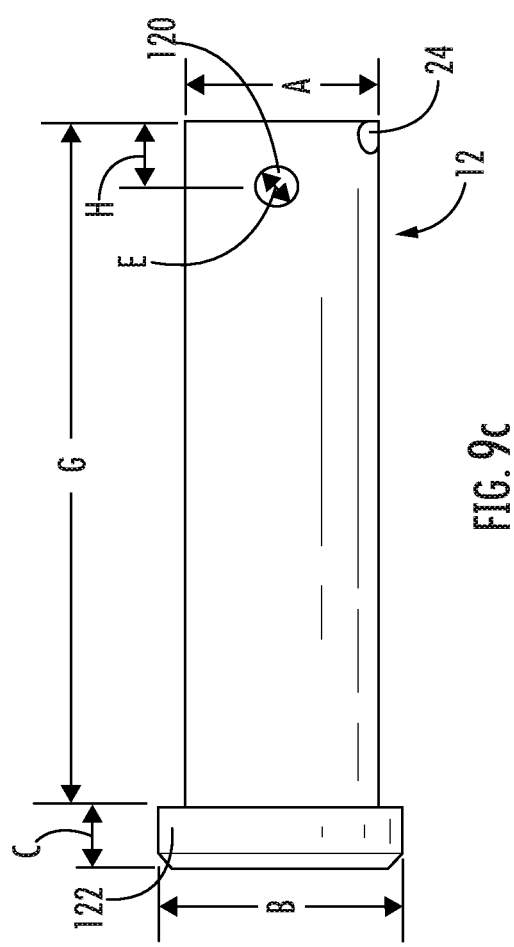
FIG. 9c is a detailed side view of an embodiment of right lever clevis pin rotated 70 degrees counter clockwise from FIG. 9b.

Examples of pins 12 and 14 for a particular application are shown in detail in FIGS. 9a-11d. These figures are drawn to scale and with the labeled dimensions (in inches) set out below. FIG. 9a is a perspective view of an embodiment of right lever clevis pin. FIG. 9b is a detailed side view of the right lever clevis pin 12. FIG. 9c is a detailed side view of the right lever clevis pin rotated 70 degrees counter clockwise from FIG. 9b. FIG. 9d is a detailed end view of the right lever clevis pin.

Figure 10A:
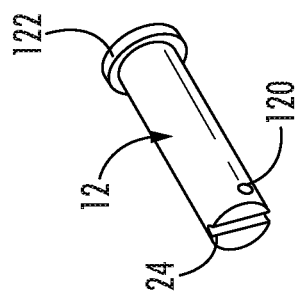
FIG. 10a is a perspective view of an embodiment of left lever clevis pin.
Figure 10D:
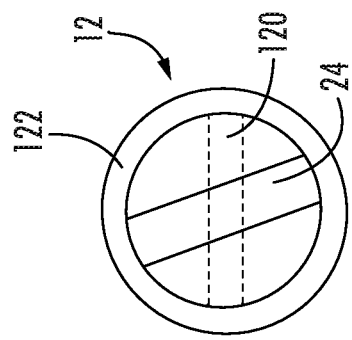
FIG. 10d is a detailed end view of an embodiment of left lever clevis pin.
Figure 10B:
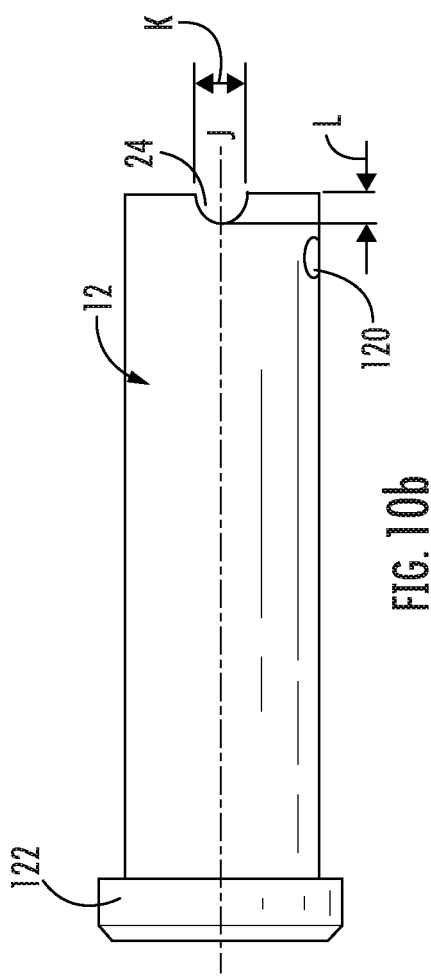
FIG. 10b is a detailed side view of an embodiment of left lever clevis pin.
Figure 10C:
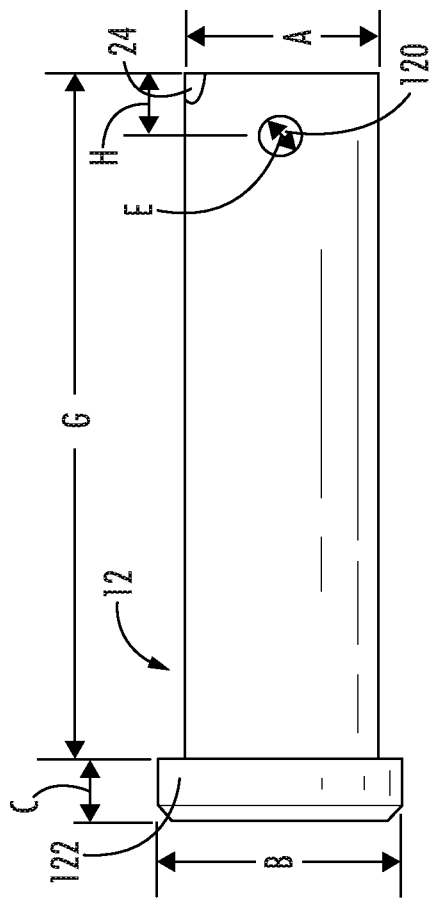
FIG. 10c is a detailed side view of an embodiment of left lever clevis pin rotated 70 degrees counter clockwise from FIG. 10b.

FIG. 10a is a perspective view of an embodiment of left lever clevis pin. FIG. 10b is a detailed side view of the left lever clevis pin. FIG. 10c is a detailed side view of the left lever clevis pin rotated 70 degrees counter clockwise from FIG. 10b. FIG. 10d is a detailed end view of the left lever clevis pin.

Figure 11C:
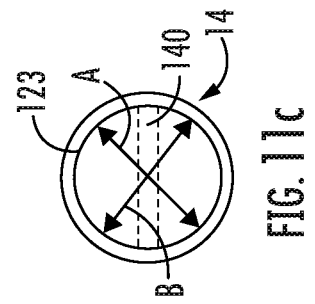
FIG. 11c is a detailed end view of an embodiment of adjuster clevis pins.
Figure 11A:
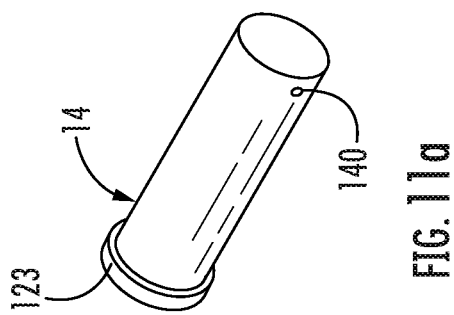
FIG. 11a is a perspective view of an embodiment of adjuster clevis pins.
Figure 11B:
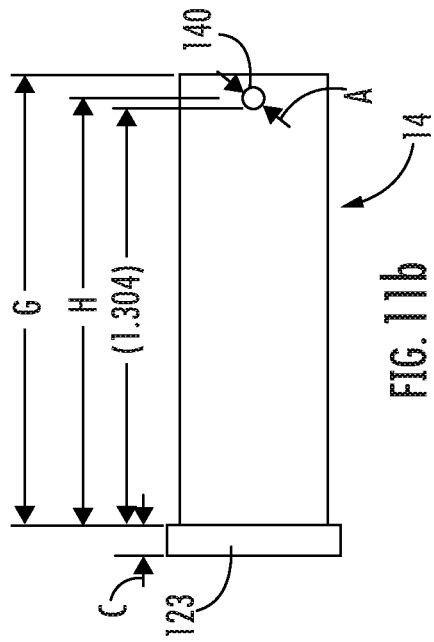
FIG. 11b is a detailed side view of an embodiment of adjuster clevis pins.

FIG. 11a is a perspective view of an embodiment of adjuster clevis pins. FIG. 11b is a detailed side view of the adjuster clevis pins. FIG. 11c is a detailed end view of the adjuster clevis pins.

The following are exemplary dimensions for the pins 12 as labeled in FIGS. 9a-10d.

A: 0.496+0/−0.005
B: 0.630+0/−0.020
C: 0.160+0/−0.020
E: 0.109+0.015/−0
G: 1.750+0.020/−0
H: 0.160+0.010/−0.010
J: 0.063 Ref.
K: 0.125+0.005/−0.005
L: 0.075+0.010/−0.010

The following are exemplary dimensions for pins 14 as labeled in FIGS. 11a-11c:

A: 0.248+0/−0.005
B: 0.380+0/−0.015
C: 0.100+0/−0.016
E: 0.109+0.015/−0
G: 1.500+0.020/−0
H: 1.359+0.010/−0.005

To greatly improve the lives of humans in general, and more specifically persons destined to toil with the process of installing and uninstalling lever clevis pins, adjuster clevis pins and spring retainer pins, the inventor has also invented a novel kit of pins and clevis pins. The kit would include one each of left and right-handed stainless spring retainer pins of the type sold by Spectra, left and right-handed 0.5 inch stainless steel lever clevis pins 12, and left and right 0.25 inch, stainless steel adjuster clevis pins 14. Other novel kits would only include right hand pins or left hand pin sets. By way of example, the lever clevis pins 12 would be 1.875 inches in length and the adjuster clevis pins 14 would be shorter than pins 12 and about 1.5 inches in length. The kits would include packaging for containing the pins and, depending upon the situation, instructions for installing the pins.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions, and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

In various exemplary embodiments, the relative dimensions, including angles, lengths, and radii, as shown in the Figures, are to scale. Actual measurements of the Figures will disclose relative dimensions, angles, and proportions of the various exemplary embodiments. Various exemplary embodiments extend to various ranges around the absolute and relative dimensions, angles, and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description. In addition, in various embodiments, the present disclosure extends to a variety of ranges (e.g., plus or minus 30%, 20%, or 10%) around any of the absolute or relative dimensions disclosed herein or determinable from the Figures.

What is claimed is:

1. A dual clevis pin assembly comprising:
   a first clevis pin having a cylindrical body disposed about a first longitudinal axis, extending between first and second ends, and having a first diameter, the first clevis pin having a head on the first end and a through-hole at the second end substantially perpendicular to the first longitudinal end;
   a second clevis pin having a cylindrical body disposed about a second longitudinal axis, extending between third and fourth ends, and having a second diameter greater than the first diameter, the fourth end having a face substantially perpendicular to the second longitudinal axis, the second clevis pin having a head on the third end, a through-hole at the fourth end having a longitudinal hole axis substantially perpendicular to the second longitudinal axis, and a slot in the face having a longitudinal slot axis substantially perpendicular to the second longitudinal axis, the hole axis and the slot axis being offset by a predefined angle greater than 45 degrees; and
   a spring pin having a first tail which extends to a first coiled portion which extends to an engagement portion which extends to a second coil portion which terminates at a second tail, the first tail extending through the first through-hole, the second tail extending through the second through-hole, and the engagement portion engaged with the slot.

2. The pin assembly of claim 1, further comprising a clevis having a first hole within which the first clevis pin is supported and a second hole within which the second clevis pin is supported such that the first and second longitudinal are parallel.

3. The pin assembly of claim 2, wherein the spring pin is fabricated from a wire with a round cross-section having a diameter.

4. The pin assembly of claim 3, wherein the slot is at least 10% wider than the diameter.

5. The pin assembly of claim 4, wherein the slot has a round bottom.

6. The pin assembly of claim 5, wherein the depth of the slot is at least 50% of the diameter.

7. The pin assembly of claim 6, wherein the first clevis pin is 0.25 inches in diameter, the second clevis pin is 0.5 inches in diameter, the diameter of the spring pin is 0.100 inches, and all of the pins are fabricated from stainless steel.

8. The pin assembly of claim 7, wherein the first clevis pin is shorter than the second clevis pin.

9. An automatic slack adjuster mechanism for a vehicle braking system comprising:
   a slack adjuster including a braking lever including a first hole at an end thereof and an adjustment rod including a second hole at the end thereof;
   a clevis including a slot having a longitudinal axis, a first set of holes each having a first diameter disposed about a first central axis perpendicular to the longitudinal axis and a second set of holes having a second diameter disposed about a second central axis perpendicular to the longitudinal axis, the first diameter being greater than the second diameter;
   a first clevis pin having a cylindrical body disposed about a first longitudinal axis, extending between first and second ends, and having a first diameter, the first clevis pin having a head on the first end and a through-hole at the second end substantially perpendicular to the first longitudinal end, the first clevis pin extending through the second set of holes and the second hole to attached the adjustment rod to the clevis;
   a second clevis pin having a cylindrical body disposed about a second longitudinal axis, extending between third and fourth ends, and having a second diameter greater than the first diameter, the fourth end having a face substantially perpendicular to the second longitudinal axis, the second clevis pin having a head on the third end, a through-hole at the fourth end having a longitudinal hole axis substantially perpendicular to the second longitudinal axis, and a slot in the face having a longitudinal slot axis substantially perpendicular to the second longitudinal axis, the hole axis and the slot axis being offset by a predefined angle greater than 45 degrees, the second clevis pin extending through the first set of holes and the first hole to attach the break lever to the clevis; and
   a spring pin having a first tail which extends to a first coiled portion which extends to an engagement portion which extends to a second coil portion which terminates at a second tail, the first tail extending through the first through-hole, the second tail extending through the second through-hole, and the engagement portion engaged with the slot.

10. The pin assembly of claim 9, wherein the spring pin is fabricated from a wire with a round cross-section having a wire diameter and the slot is at least 10% wider than the wire diameter.

11. The pin assembly of claim 10, wherein the slot has a round bottom and the depth of the slot is at least 50% of the wire diameter.

12. The pin assembly of claim 11, wherein the first clevis pin is 0.25 inches in diameter, the second clevis pin is 0.5 inches in diameter, the diameter of the spring pin is 0.100 inches, and all of the pins are fabricated from stainless steel.

13. The pin assembly of claim 12, wherein the first clevis pin is shorter than the second clevis pin.

14. A dual clevis pin and spring kit comprising:
a pair of first clevis pins each having a cylindrical body disposed about a first longitudinal axis, extending between first and second ends, and having a first diameter, the first clevis pins each having a head on the first end and a first through-hole at the second end substantially perpendicular to the first longitudinal end;
a second clevis pin having a cylindrical body disposed about a second longitudinal axis, extending between third and fourth ends, and having a second diameter greater than the first diameter, the fourth end having a face substantially perpendicular to the second longitudinal axis, the second clevis pin having a head on the third end, a second through-hole at the fourth end having a longitudinal first hole axis substantially perpendicular to the second longitudinal axis, and a first slot in the face having a longitudinal first slot axis substantially perpendicular to the second longitudinal axis, the first hole axis and the first slot axis being offset by a predefined angle greater than 45 degrees;
a third clevis pin having a cylindrical body disposed about a third longitudinal axis, extending between fifth and sixth ends, and having the second diameter, the sixth end having a face substantially perpendicular to the third longitudinal axis, the third clevis pin having a head on the fifth end, a third through-hole at the sixth end having a longitudinal second hole axis substantially perpendicular to the third longitudinal axis, and a second slot in the face having a longitudinal second slot axis substantially perpendicular to the third longitudinal axis, the second hole axis and the second slot axis being offset by an angle opposite to that of the predetermined angle;
a first spring pin having a first tail which extends to a first coiled portion which extends to first engagement portion which extends to a second coiled portion which terminates at a second tail, the first tail extendable through one of the first through-holes, the second tail extendable through the second through-hole, and the first engagement portion engageable with the first slot when the second tail is within the second through-hole;
a second spring pin having a third tail which extends to a third coiled portion, opposite in configuration to the first coiled portion, which extends to a second engagement portion which extends to a fourth coil portion which terminates at a fourth tail, the third tail extendable through the other of the first through-holes, the fourth tail extendable through the second through-hole, and the second engagement portion engageable with the second slot when the fourth tail is within the third through-hole; and
a package for containing the pins.

15. The kit of claim 14, further comprising instructions for engaging the spring pins with the first, second and third pins.

16. The kit of claim 14, wherein the spring pin is fabricated from a wire with a round cross-section having a wire diameter and the slot is at least 10% wider than the wire diameter.

17. The kit of claim 16, wherein the slot has a round bottom and the depth of the slot is at least 50% of the wire diameter.

18. The kit of claim 14, wherein the first clevis pin is 0.25 inches in diameter, the second clevis pin is 0.5 inches in diameter, the diameter of the spring pin is 0.100 inches, and all of the pins are fabricated from stainless steel.

19. The pin of claim 17, wherein the first clevis pin is 0.25 inches in diameter, the second clevis pin is 0.5 inches in diameter, the diameter of the spring pin is 0.100 inches, and all of the pins are fabricated from stainless steel.

20. The pin of claim 19, wherein the predetermined angle is between 65 and 75 degrees.

* * * * *